Sept. 30, 1952 J. J. MACIEJOWSKI ET AL 2,611,912
MACHINE FOR USE IN THE MANUFACTURE OF INSOLES
Filed Oct. 12, 1949 13 Sheets-Sheet 1

Inventors
John J. Maciejowski
Fred T. MacKenzie
By their Attorney
Thomas Ryan

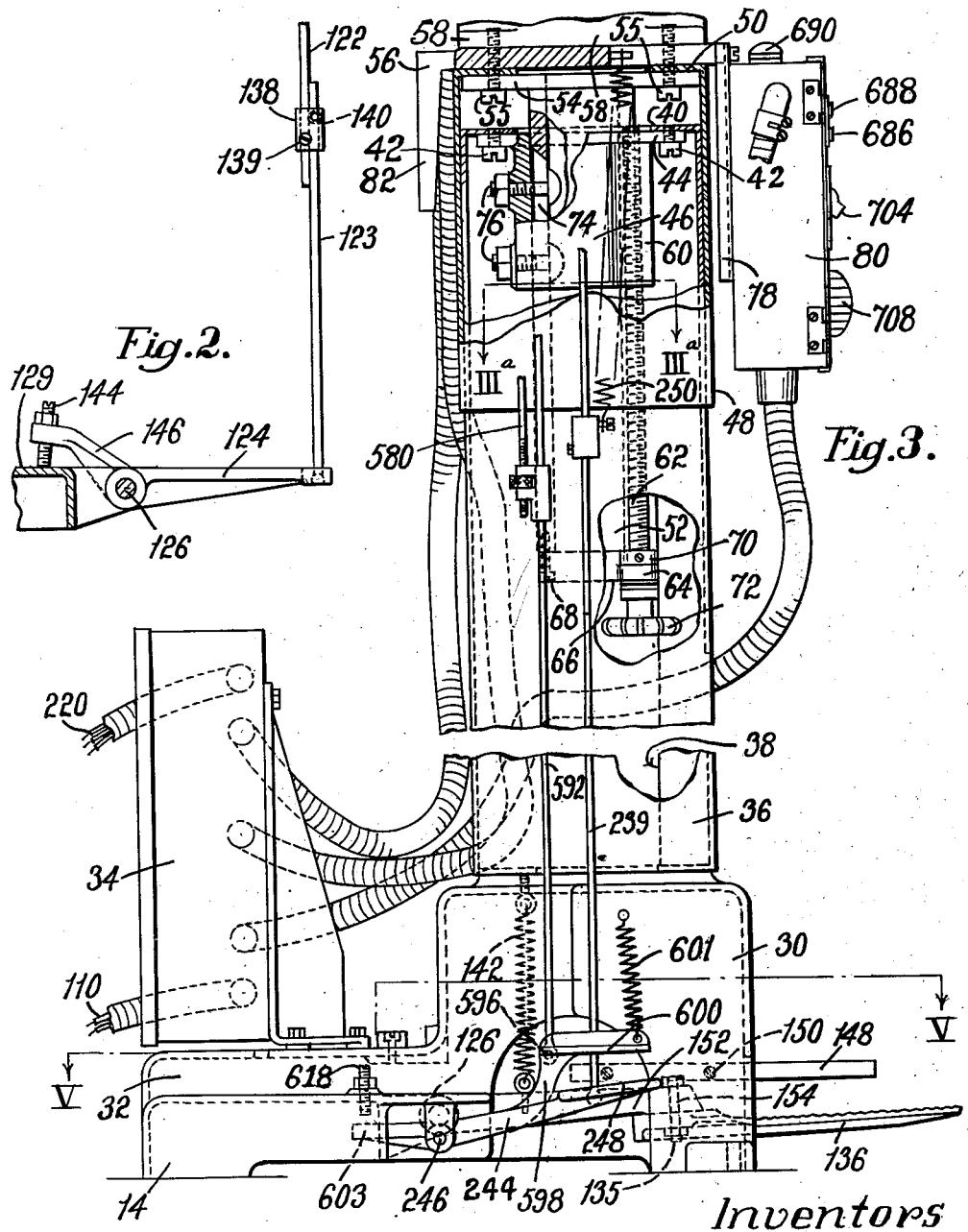
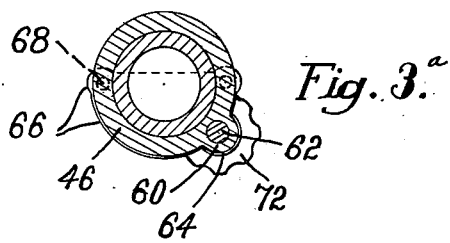

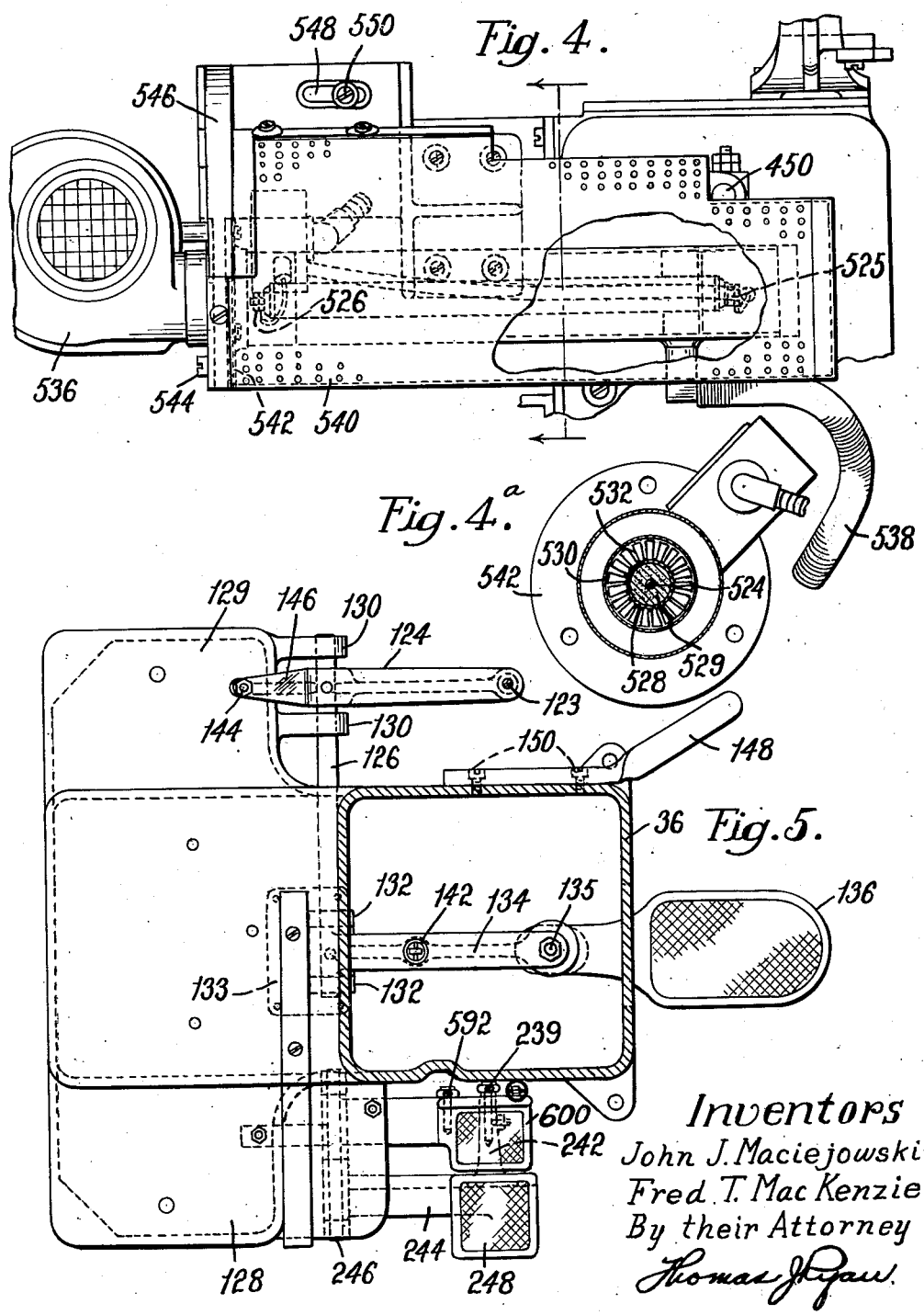

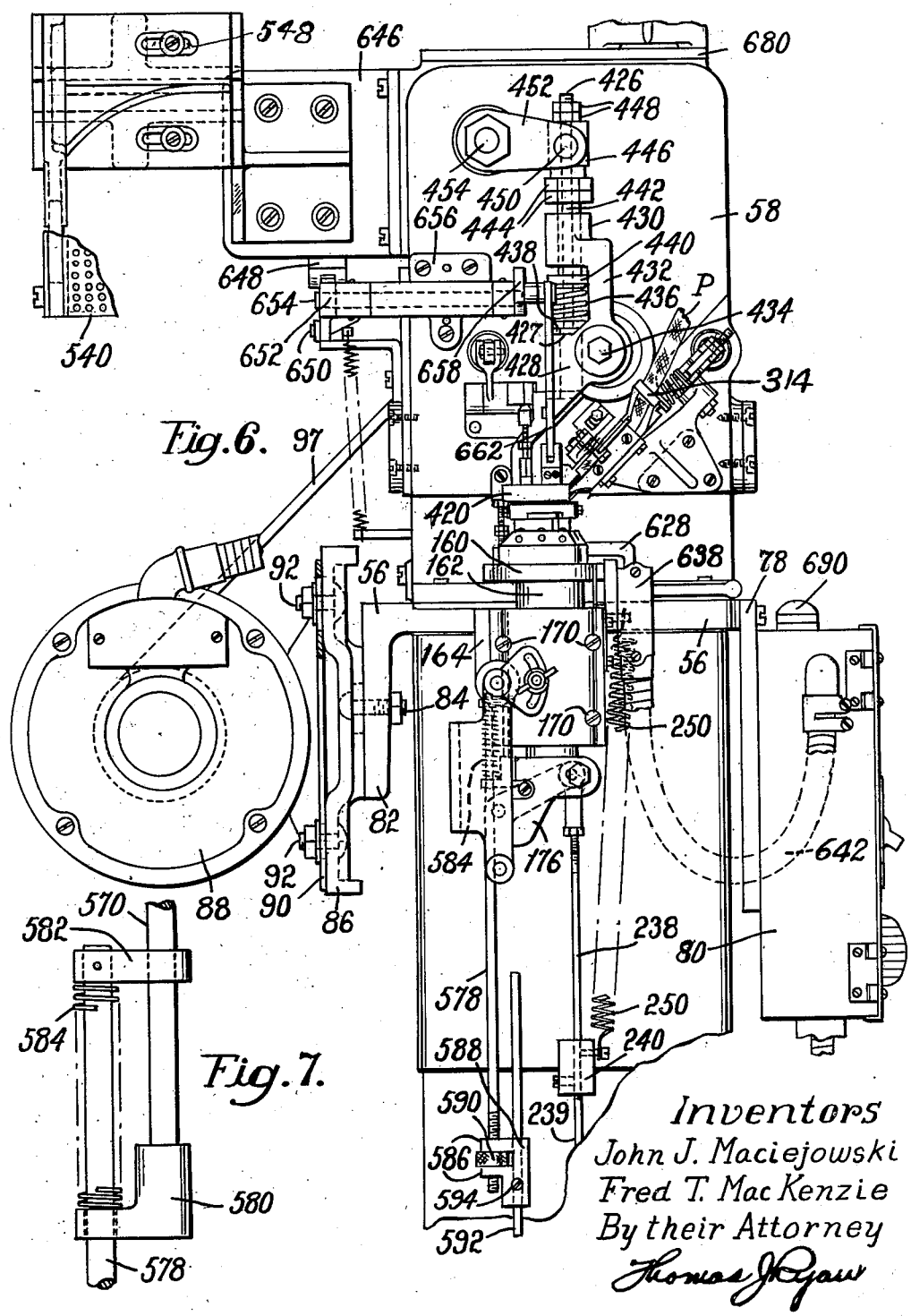

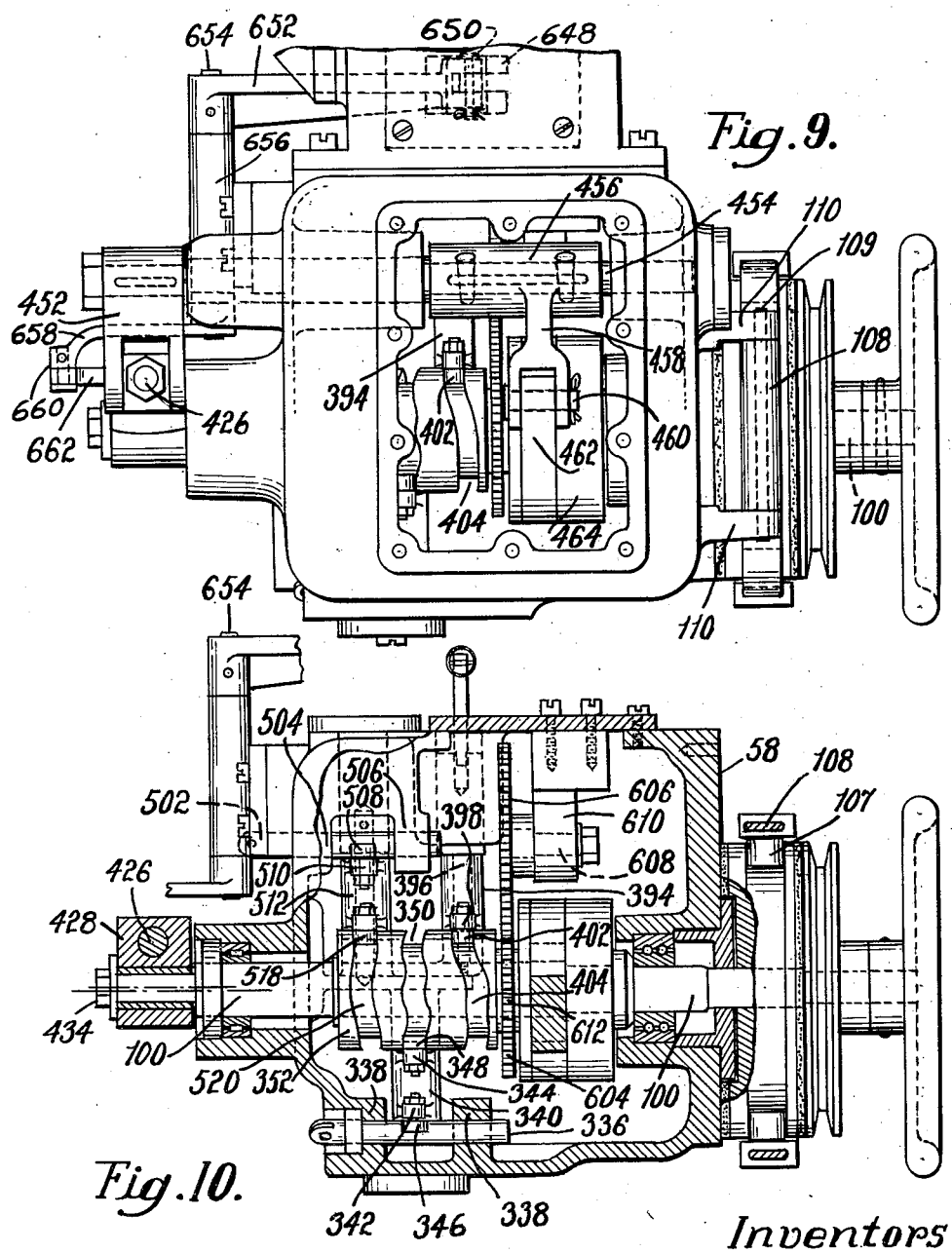

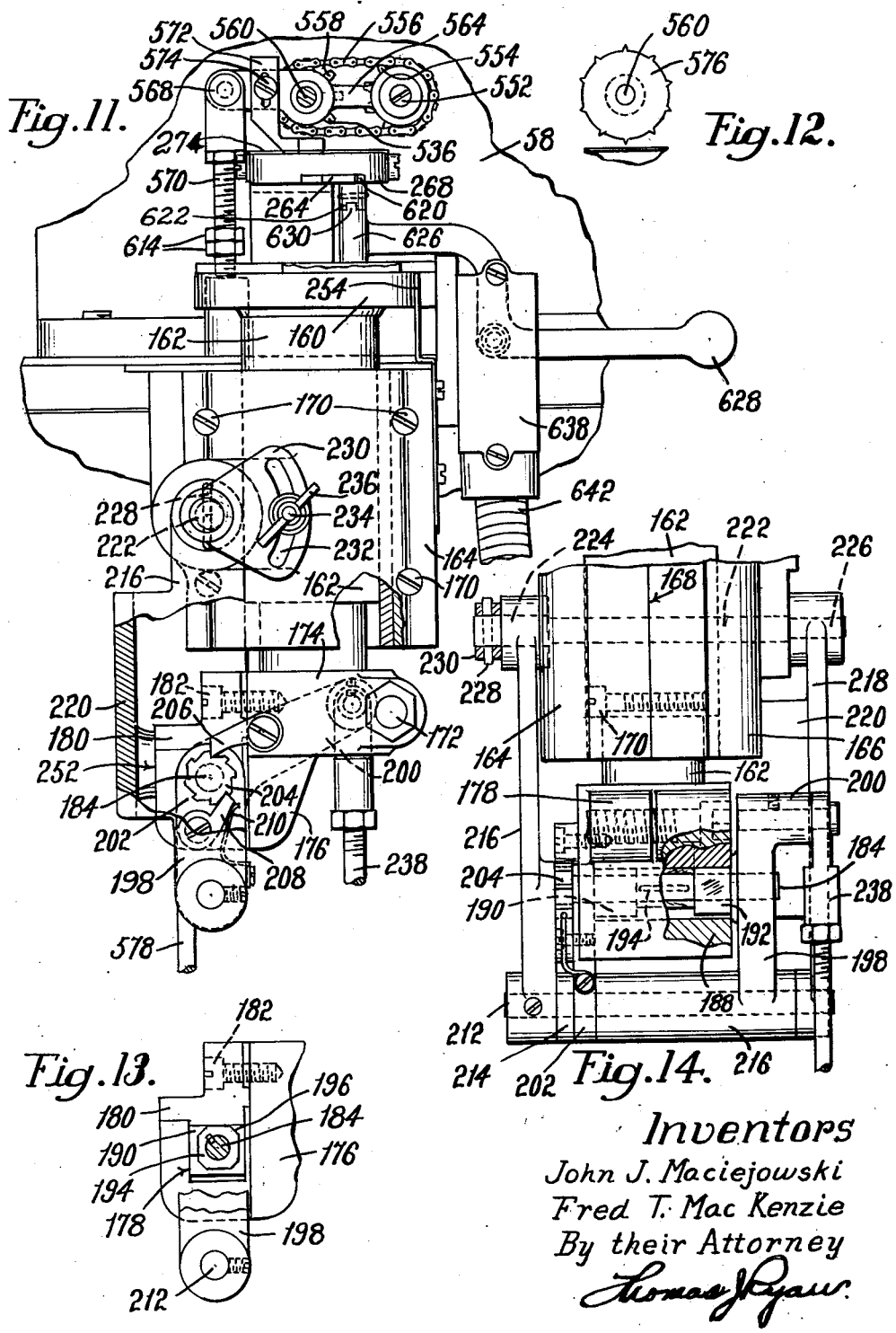

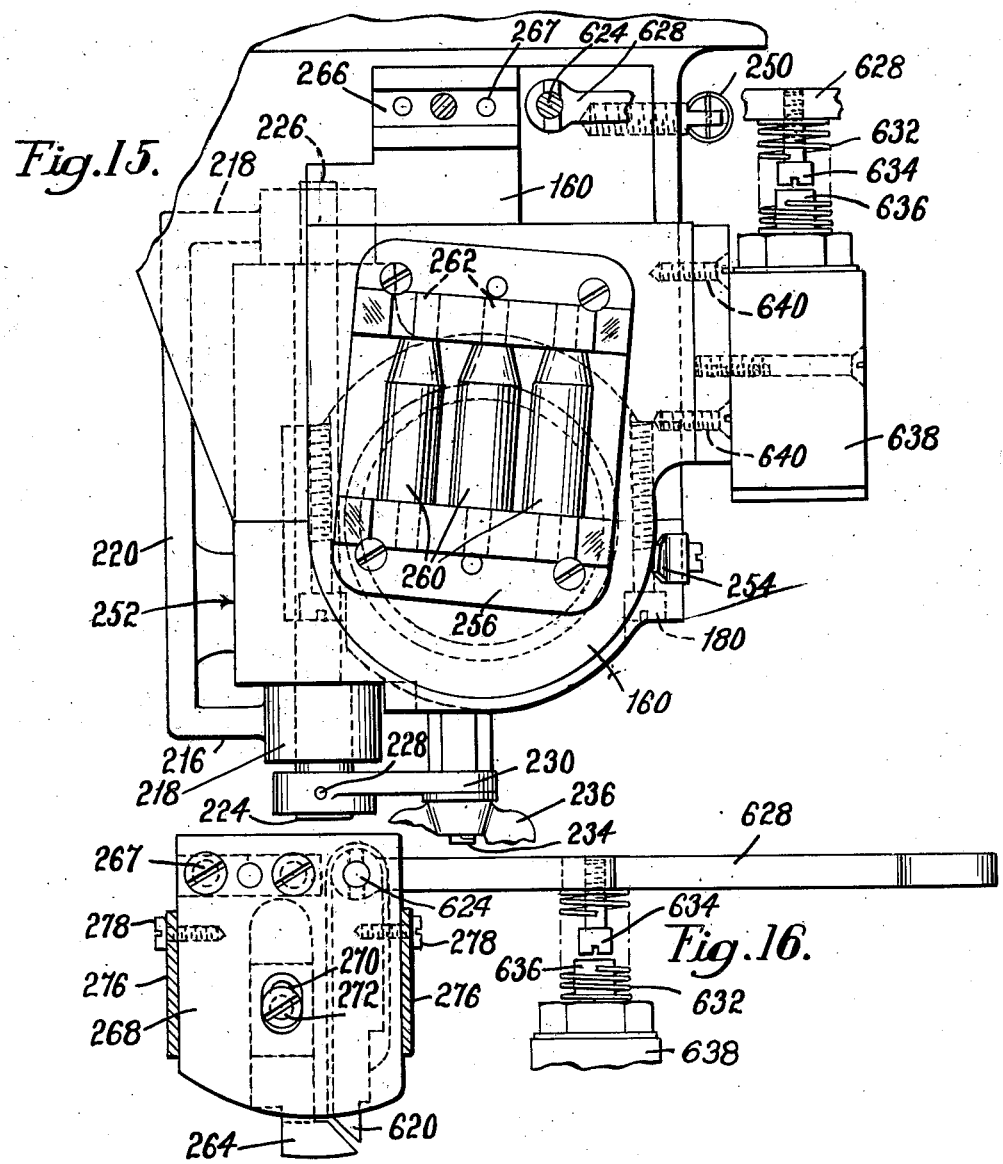
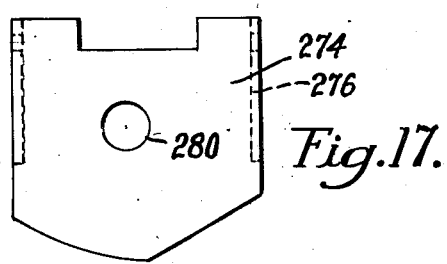

Inventors
John J. Maciejowski
Fred T. MacKenzie
By their Attorney
Thomas J. Ryan Sept. 30, 1952 J. J. MACIEJOWSKI ET AL 2,611,912
MACHINE FOR USE IN THE MANUFACTURE OF INSOLES
Filed Oct. 12, 1949 13 Sheets-Sheet 10

Inventors
John J. Maciejowski
Fred T. MacKenzie
By their Attorney
Thomas Hogan

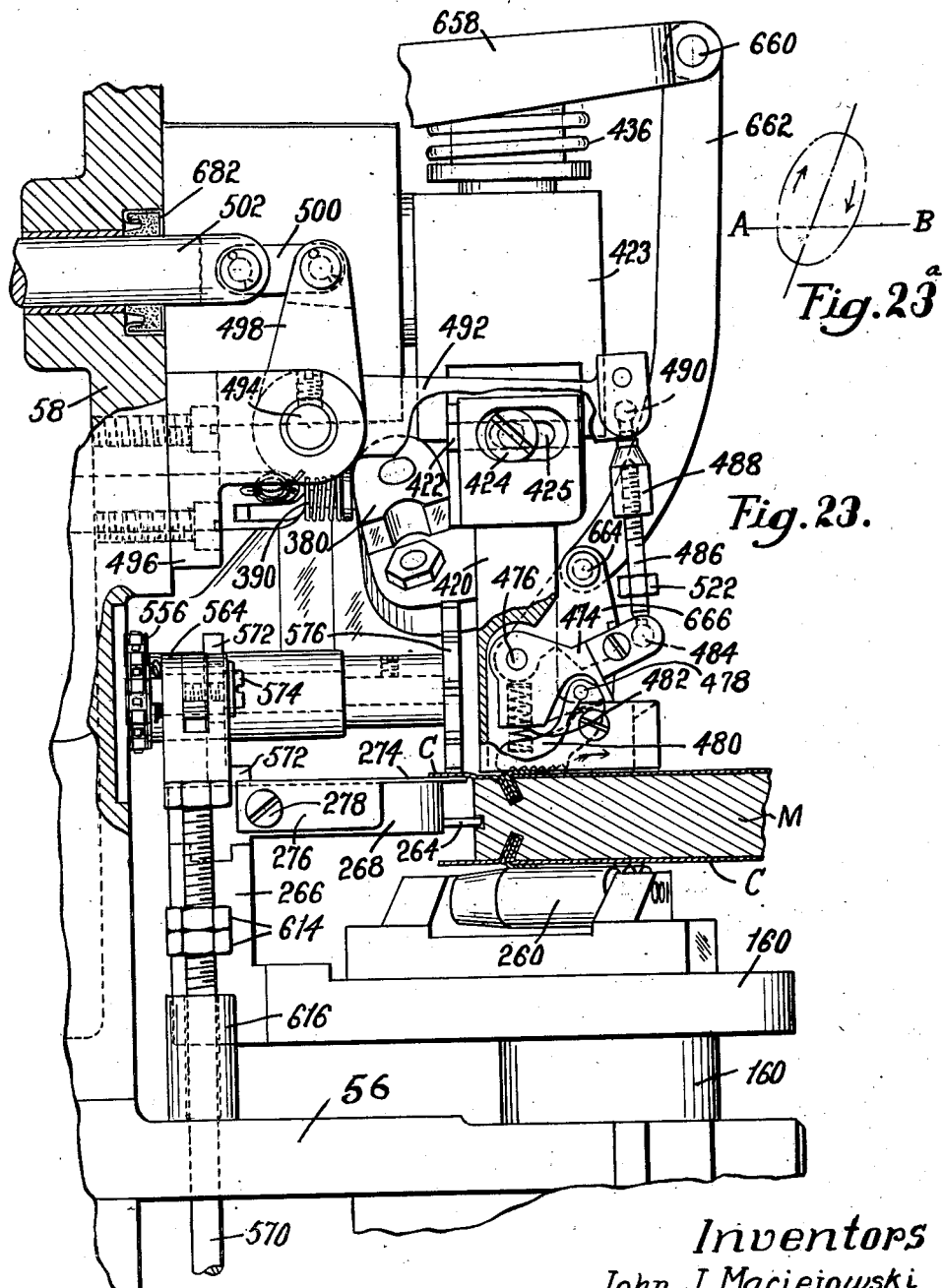

Sept. 30, 1952   J. J. MACIEJOWSKI ET AL   2,611,912
MACHINE FOR USE IN THE MANUFACTURE OF INSOLES
Filed Oct. 12, 1949   13 Sheets-Sheet 12
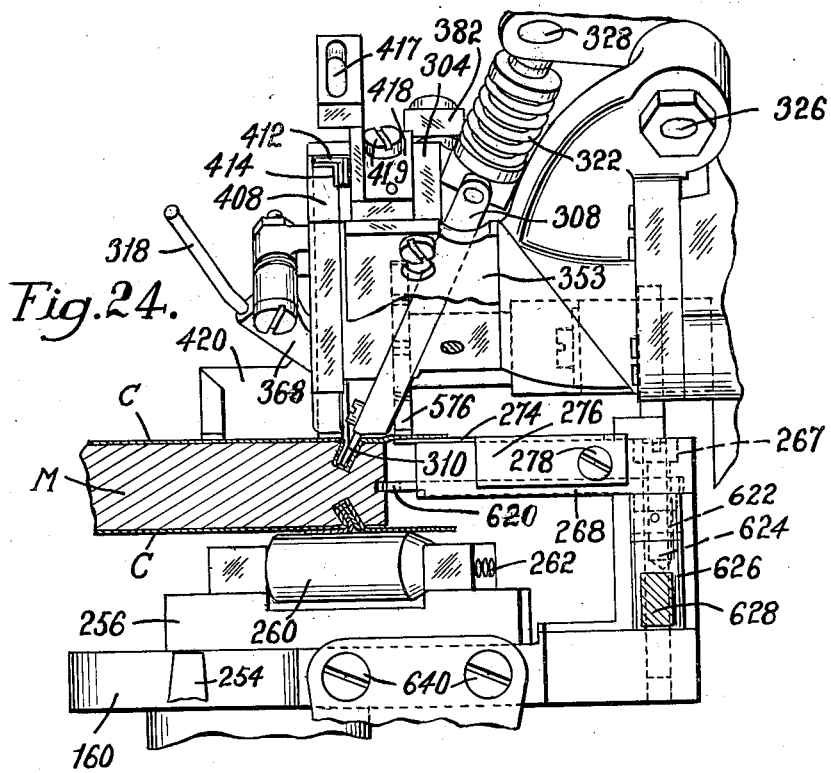
Fig. 24.
Fig. 25.
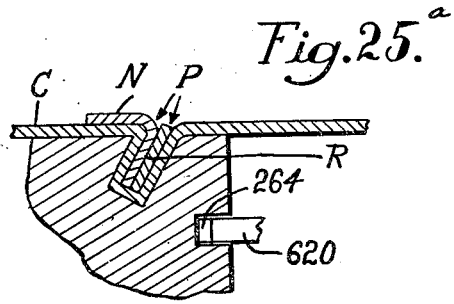
Fig. 25.ª
Inventors
John J. Maciejowski
Fred T. MacKenzie
By their Attorney Sept. 30, 1952 J. J. MACIEJOWSKI ET AL 2,611,912
MACHINE FOR USE IN THE MANUFACTURE OF INSOLES
Filed Oct. 12, 1949 13 Sheets-Sheet 13

*Inventors*
John J. Maciejowski
Fred T. MacKenzie
By their Attorney

Patented Sept. 30, 1952

2,611,912

UNITED STATES PATENT OFFICE 2,611,912

MACHINE FOR USE IN THE MANUFACTURE OF INSOLES

John J. Maciejowski, Ipswich, and Fred T. MacKenzie, Beverly, Mass., assignors to United Shoe Machinery Corporation, Flemington, N. J., a corporation of New Jersey Application October 12, 1949, Serial No. 121,038

17 Claims. (Cl. 12—20)

This invention relates to machines for use in the manufacture of shoes and particularly to machines for use in making insoles.

In a recently developed method of making the insoles disclosed in an application for Letters Patent of the United States Serial No. 717,121, filed December 19, 1946, which has matured into Patent No. 2,538,776, granted January 23, 1951, in the name of Stanley M. Griswold, a matrix is provided which is made in accordance with the disclosure of an application for Letters Patent of the United States Serial No. 717,122, filed December 19, 1946, in the names of Stanley M. Griswold and Hans C. Paulsen which has matured into Patent No. 2,577,749, granted December 11, 1951.

The machine of the present invention is for use in the practice of the above-mentioned method of making insoles and is of the type disclosed in applications for Letters Patent of the United States Serial No. 725,415, filed January 31, 1947, which has matured into Patent No. 2,493,207, granted January 3, 1950, and Serial No. 13,197, filed March 5, 1948, which has matured into Patent No. 2,494,578, granted January 17, 1950, both in the name of Hans C. Paulsen. In the machine of the last-mentioned application, a vertically movable work support having inclined rollers rigidly sustains an insole-shaped matrix having an inwardly inclined rib groove on each face and a groove in its edge face the bottom of which is at a predetermined distance from the rib grooves. A guide engages the edge groove, and a sheet of canvas is tucked by a reciprocating tool into one rib groove of the matrix. A core piece having a flange is fed into position over the fold made by the tucking tool. A four-motion feed foot forces the core piece into the fold and advances the work. The flange of the core piece is worked inwardly of the matrix. An auxiliary feed wheel is used at will to help feed the margin of the canvas. A hot air blast is directed on the work at the operating point and a trigger operated by engagement with the end of the edge groove operates a microswitch and solenoid to cause the core piece to be severed. The matrix is released, turned over, canvas applied, and, when the work support is again raised, it is automatically located slightly lower to compensate for the layer of canvas first applied. The operations are repeated on the second side of the matrix.

Objects of the present invention are to improve and perfect machines of this type and to provide a durable and conveniently operated machine for commercial use without sacrificing any of the advantages of prior machines.

The illustrated machine, as a feature of the invention, has a head casing made oil tight and containing most of the mechanism subject to wear. A main drive shaft extends through two walls of the casing and carries in the casing a barrel cam having a plurality of tracks. A plurality of plungers extend through a wall of the casing, and lever means is provided to connect each plunger to one of the cam tracks. A canvas-tucking tool is operated by one of the plungers and a core-piece-feeding pawl is operated by another.

The four-motion feed foot is operated in an elliptical orbit by the drive shaft, the major axis of the orbit being inclined in a vertical plane with its upper end farther away from the feed point. A portion of the feed foot has ridges inclined to the direction of feed so that a component of movement of the feed foot in the direction of feed causes the inclined ridges of the feed foot to smooth out the flange of the core piece before its downward component becomes effective to press the core piece firmly upon the matrix.

If desired, a third plunger operated by the barrel cam may be connected outside the casing to a wiper carried by the feed foot and operated by the cam to smooth down the flange of the core piece and draw it inwardly of the matrix to cause the rib formed by the fold of canvas and the core piece to be drawn against the inner wall of the rib groove.

To accommodate matrices having inwardly inclined rib grooves, the tucking tool is mounted for reciprocation in a rectilinear path so inclined that the tool operates in a plane parallel to the walls of the inclined groove at the operating point.

Above the guide which engages the groove in the edge face of the matrix is a horizontal plate so hinged as to have a slight upward movement and arranged to support a marginal portion of the canvas which extends beyond the matrix. Auxiliary feed mechanism which can be used at the will of the operator is provided. This comprises a toothed wheel located above the plate and moveable toward it through adjustable yielding means operated, for example, by a treadle. By the present invention the feed wheel is driven by the main shaft through gearing located in the casing. A shaft extending through the casing is connected to a toothed wheel, and the ratio of the gearing is so related to the number of teeth on the wheel that a space between the teeth will be presented when the tucking tool is in the groove and a tooth of the wheel will engage the canvas when the tucking tool is out of the groove and will assist in feeding the canvas and avoid wrinkles therein, for example, when rounding the toe portion of the matrix. Two stops are provided, one for limiting downward movement of the feed wheel to prevent engagement of the feed wheel with the plate when the work support is raised and the other to prevent excessive movement thereof when the work support is lowered.

As a feature of the present invention, the microswitch is mounted upon the work support with the trigger and a flexible lead extends from the work support to a source of current and to the solenoid. Thus, relative heightwise movement between the trigger and the microswitch is avoided.

These and other novel combinations and arrangements of parts will appear more fully from the following description when read in connection with the accompanying drawings and will be pointed out in the appended claims.

In the drawings,

Fig. 2 is a detail in elevation of the treadle mechanism;

Fig. 3 is an elevation, partly in section, of the base and column of the machine;

Figure 8:
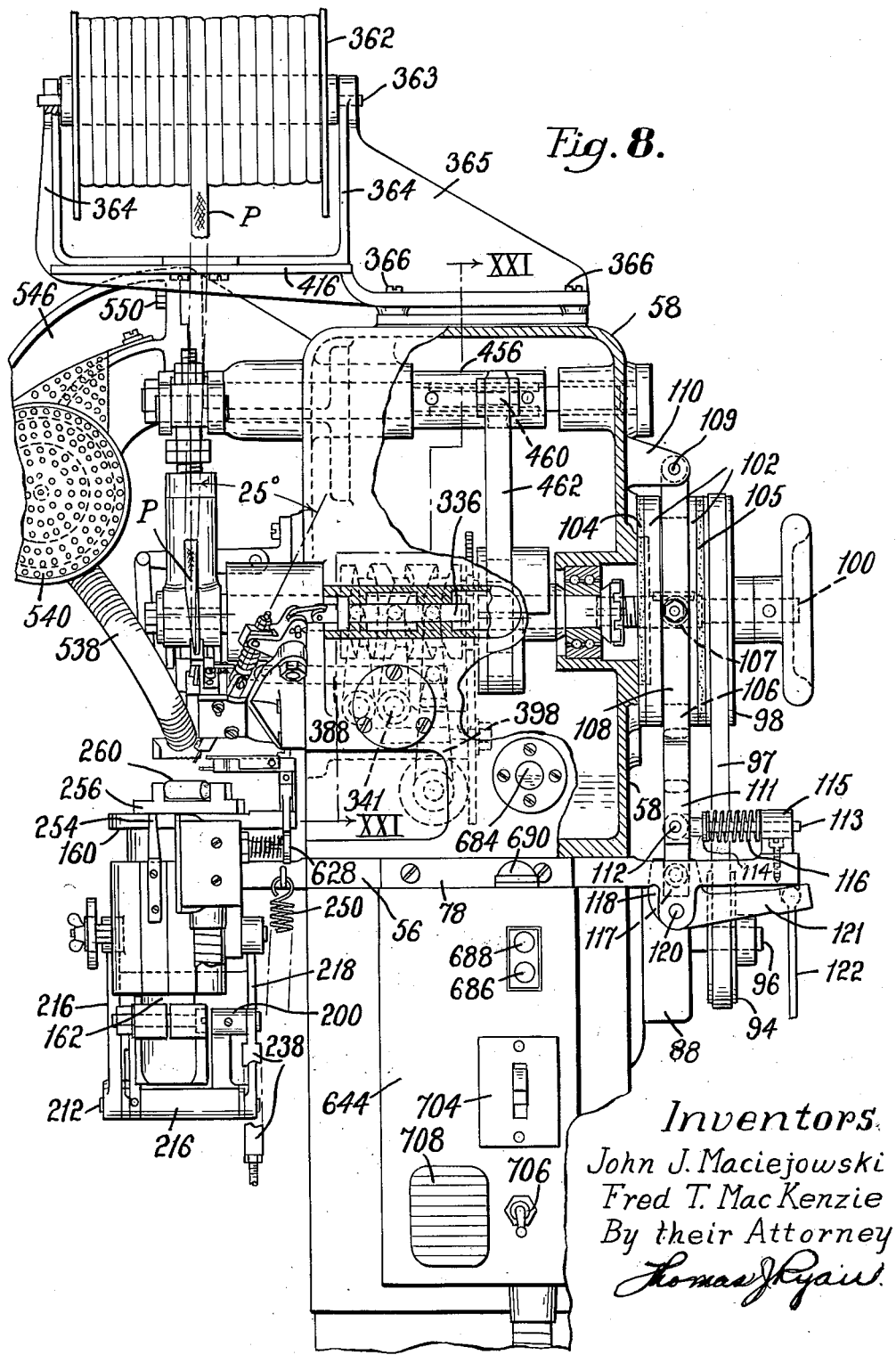
Figure 18:
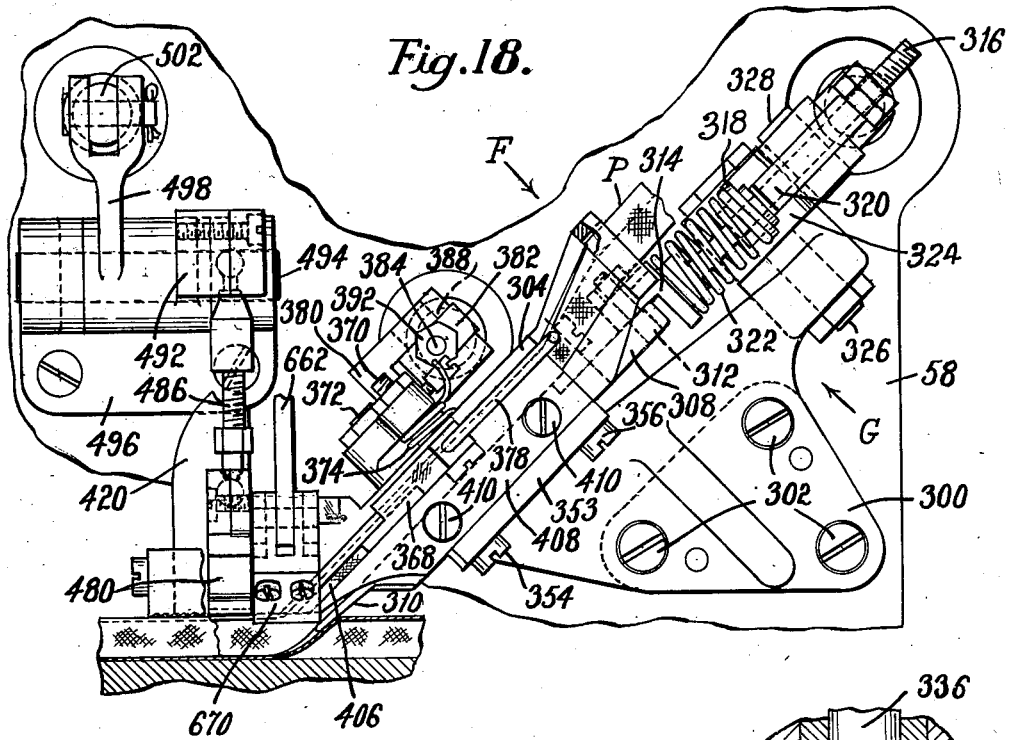
Figure 19:
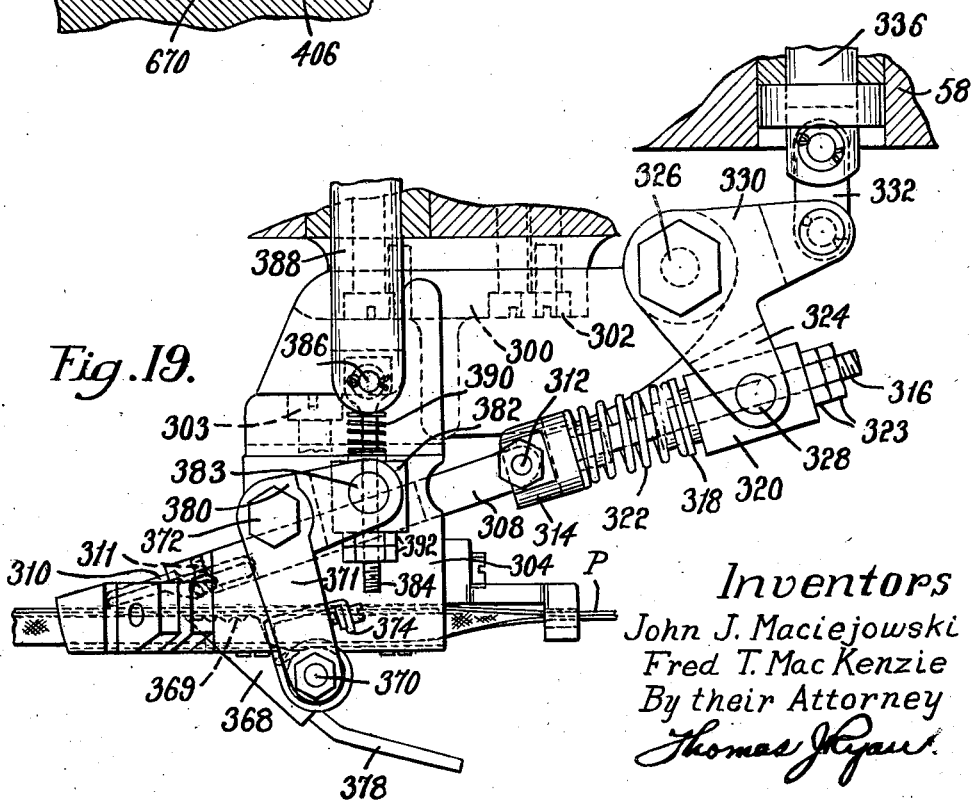
Figure 20:
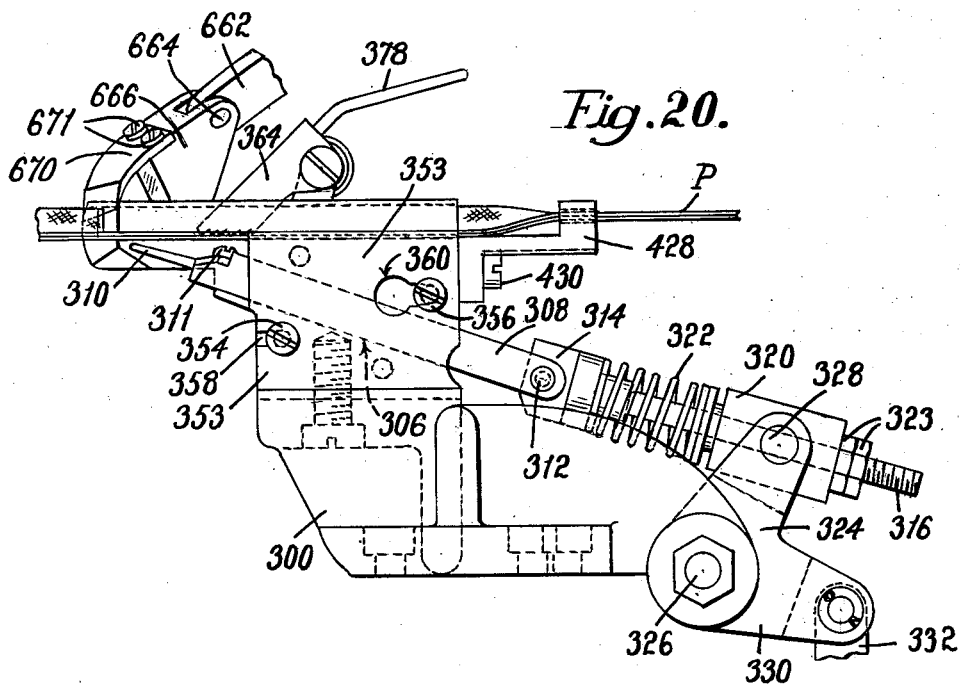
Figure 22:
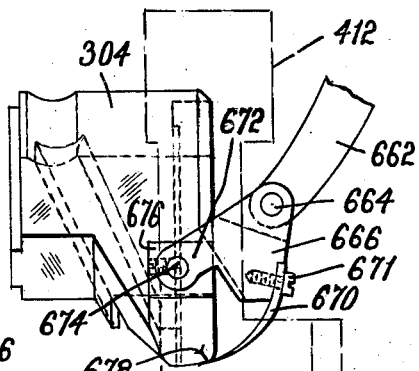
Figure 21:
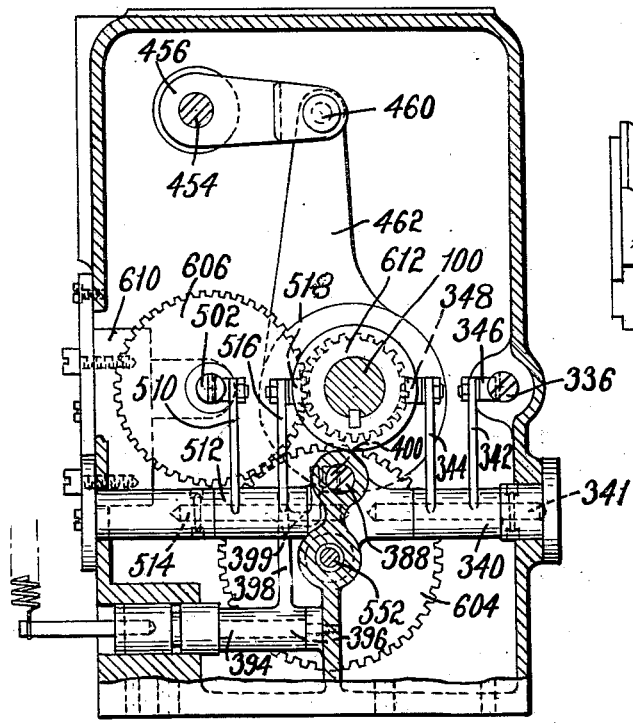
Figure 26:
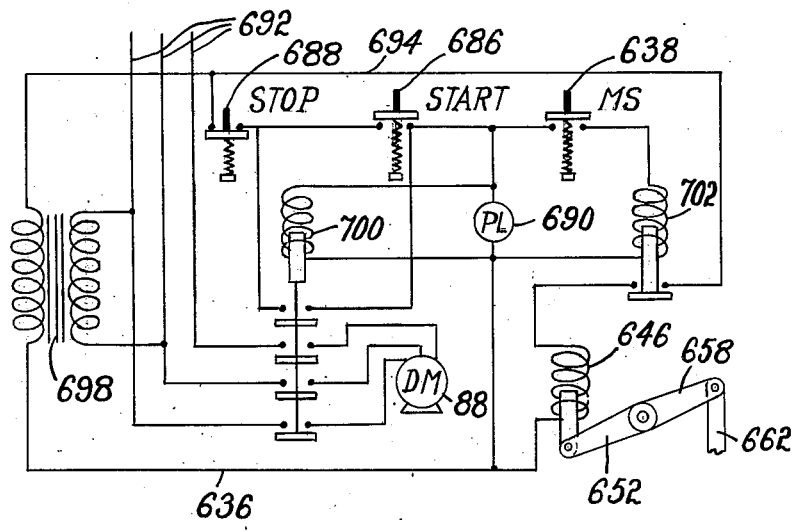
Figure 27:
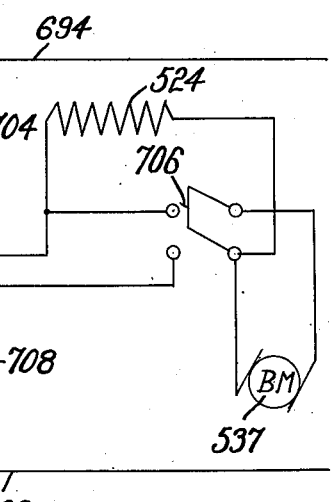
Figure 28:
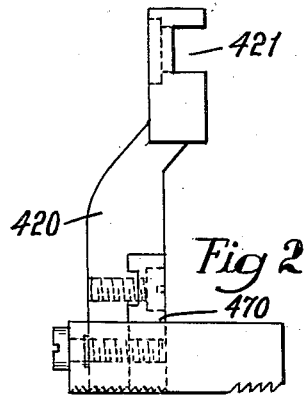

Fig. 3ª is a sectional view of parts shown in Fig. 3;

Fig. 4 is a front view of the hot-air blast mechanism, a portion being broken away;

Fig. 4ª is a view, partly in section, of parts shown in Fig. 4;

Fig. 5 is a sectional plan view of the treadle mechanism on the line V—V of Fig. 3;

Fig. 6 is a front elevation of the head of the machine;

Fig. 7 is a detail view of parts shown in Fig. 6;

Fig. 8 is a side view of the head of the machine, parts being in section;

Fig. 9 is a plan view of the head of the machine with the top plate removed;

Fig. 10 is a view, partly in horizontal section, of parts shown in Fig. 9;

Fig. 11 is a front view, partly in section of the work support and auxiliary feed mechanism;

Fig. 12 is a detail view of the auxiliary feed wheel;

Fig. 13 is a sectional detail of parts shown in Fig. 11;

Fig. 14 is an elevation, partly in section, of parts shown in Fig. 11;

Fig. 15 is a plan view of the work support;

Fig. 16 is a plan view of parts associated with Fig. 15;

Fig. 17 is a plan view of a part associated with Fig. 16;

Fig. 18 is a front elevation of the canvas-tucking mechanism;

Fig. 19 is a view taken in the direction of the arrow F in Fig. 18;

Fig. 20 is a view taken in the direction of the arrow G in Fig. 18;

Fig. 21 is a vertical section through the head of the machine;

Fig. 22 is a front elevational detail of parts shown in Fig. 20;

Fig. 23 is a side view, partly in section, showing the wiper and auxiliary feed mechanism;

Fig. 23ª is a diagram representing the path of the feed foot;

Fig. 24 is a side elevation showing the matrix in section;

Fig. 25 is a view of the matrix with canvas applied to one side thereof;

Fig. 25ª is an enlarged sectional view of the matrix, canvas and core piece;

Fig. 26 is a wiring diagram of the driving motor and the core-piece-cutting solenoid;

Fig. 27 is a wiring diagram of the hot-air blast apparatus;

Fig. 28 is a front elevation of the feed foot; and

Figure 29:
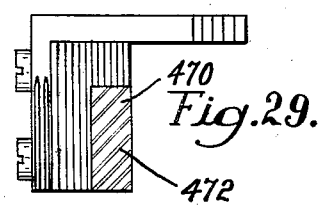

Fig. 29 is a bottom plan view of the feed foot shown in Fig. 28.

For use with this machine, a matrix M (Fig. 25) is provided which comprises an insole-shaped body the opposite faces of which are flat and parallel. Each face has a groove V therein located with respect to the edge of the matrix so that it represents the shape and location of the rib desired on the insole. It is desirable that the rib of the resulting insole be inclined inwardly with respect to the insole and hence the walls of the grooves V in the matrix are inclined inwardly with respect thereto. For example, as illustrated, the walls of the groove are parallel and the inner wall is at an angle of 65° to the adjacent flat face of the matrix. In the edge face of the matrix is a groove E the bottom of which is at a uniform predetermined distance from the groove V, the bottom of the groove E being utilized in guiding the matrices in the operation of the machine thereon and the ends A of the groove serving as abutments to determine the beginning and end of the operation of the machine.

Figure 1:
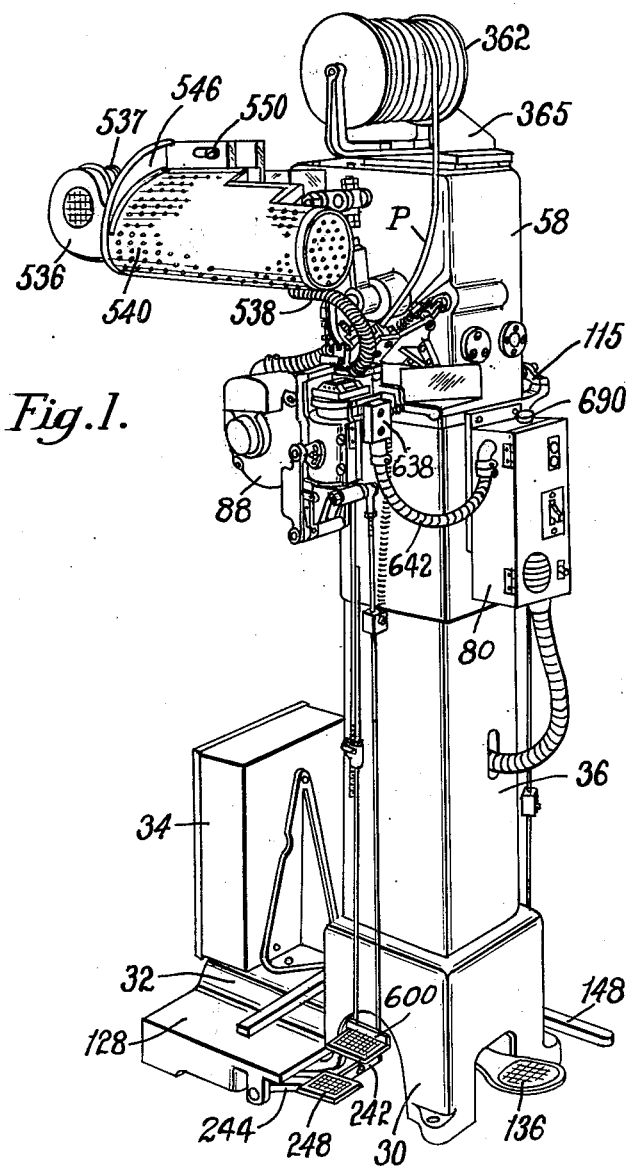
Fig. 1 is a perspective view of the machine.

The machine comprises a base 30 (Figs. 1 and 2) having an extension 32 to which a junction box 34 is secured. On the base 30 is a hollow column 36 having on the back side a large opening 38, as indicated in Fig. 3. The upper end of the column has an inwardly extending flange 40 to which is secured by screws 42 the flange 44 of a flanged cylindrical member 46. Telescoping over the upper end of the column 36 is a shell or cap 48 having an inturned flange 50. A long sleeve 52 extends down through the cylindrical member 46 and has a flange 54 at its upper end which is secured by screws 55 to the flange 50 of the cap, to a bracket 56 and to a head casing 58.

Head-adjusting means

In order properly to operate the treadles with which the machine is provided, the operator occupies a sitting position. For convenience of operators of different heights, the head is arranged for vertical adjustment. On the member 46 is a boss 60 (Fig. 3ª) having a hole threaded to receive a vertical screw 62. The lower end of the screw is mounted in an ear 64 on a member 66 secured to the sleeve 52, the ear 64 being held between a collar 70 secured to the screw and a hand wheel 72 also secured to the screw. The screw may be turned by the hand wheel to raise and lower the sleeve 52 and hence the bracket 56 and the head casing 58.

The sleeve 52 has in one side a long vertical slot 74 in which are bolts 76 which pass through holes in the member 46, the heads of the bolts being of course wider than the slot 74. Tightening of nuts on the bolts 76 secures the head in adjusted position.

Motor drive

To the bracket 56 on top of the column at one side of the mahcine is secured a plate 78 carrying a switch box 80, and on the opposite side of the column the bracket 56 has a downward extension 82 to which is secured by a bolt 84 (Fig. 6) a motor base plate 86. A motor 88 has a base 90 secured by bolts 92 to the plate 86, the bolt holes in the base being elongated vertically to provide for vertical adjustment of the motor 88. A pulley 94 (Fig. 8) on the motor shaft 96 of the motor 88 is connected by a belt 97 to a pulley 98 loose on the main shaft 100 extending through the head casing 58 of the machine. Since the motor is mounted on the bracket 56 which is carried by the head 58, no change of the belt 97 is required when the head is adjusted vertically.

Clutch mechanism

A pulley 102 (Fig. 8) is splined to the main shaft 100, has friction facings 104, 105 thereon and has a peripheral groove 106 in which are rolls 107 carried by a yoke 108 pivoted at 109 to ears 110 on the head 58. A downward extension 111 of the yoke has pivoted thereto at 112 a rod 113 on which is a collar 114. The rod extends loosely through a bearing 115 fixed to the bracket 56, and between the collar 114 and the bearing 115 is a compression spring 116. On the lower end of the extension 111 is a roll 117 lying in a bifurcation of an arm 118 of an angle lever fulcrumed at 120 to the bracket 56. Another arm 121 of the angle lever is pivotally connected to a treadle rod 122. The treadle rod is in two parts, the lower part 123 (Fig. 5) being pivoted to an arm 124 pinned to a rockshaft 126. The extension 32 of the base has wings 128, 129 at each side thereof and on the wing 129 are ears 130 forming bearings for the end portion of the rockshaft 126. The other end portion of the rockshaft is journaled in ears 132 formed on a plate 133 secured to the under side of the base 30. Between the ears 132 is a treadle lever 134 pinned to the rockshaft 126. The free end of the lever 134 is pivoted by a vertical bolt 135 to a treadle 136. The treadle rods 122, 123 are connected together (Fig. 2) by passing each through a hole in a block 138, one rod being held therein by a set screw 139 and the other by a set screw 140. The effective length of the two rods 122, 123 may be varied by loosening either or both of the set screws and sliding the rods in the holes in the block, thus accommodating the length of the rod as a whole to the height to which the head is adjusted by the screw 62. The treadle lever 134 is held raised by a tension spring 142 (Fig. 3) connected to it at one end and at the other to the base 30. The movement of the rockshaft, due to the tension of the spring 142, is adjustably limited (Fig. 2) by a screw 144 threaded through an extension 146 of the arm 124 and arranged to engage the top of the wing 129.

Depression of the treadle rocks the shaft 126, pulls down on the rod 122, 123 and turns the lever 118, 121 (Fig. 8) clockwise on the pivot 120, thus swinging the yoke 108 on its pivot 109 against the spring 116 to cause the friction facing 105 on the pulley 102 keyed to the shaft 100 to engage the pulley 98 driven by the motor 88, the shaft 100 being thus driven to operate the machine. When the treadle is released, the spring 116 reacts to swing the yoke 108 in the opposite direction, causing the friction facing 104 to engage a finished surface of the head 58, thus braking and stopping the shaft 100.

In operating the machine, the operator sits with the heel of the right foot on the treadle 136 (Fig. 5), the toe of the foot resting on a bar 148 secured at 150 to the base 30. The treadle 136 may be swung on its vertical pivot 135 toward and from the toe rest 148 to accommodate feet of different lengths.

The work support

The work support comprises a table 160 (Figs. 6, 11, 13 and 14) having a cylindrical stem 162 of two diameters arranged to slide vertically in a two-part sleeve 164, 166 depending from the bracket 56. The sleeve separates on a vertical line 168 (Fig. 14) and is held together by screws 170. To the lower reduced end portion of the stem 162 is clamped by a bolt 172 a collar 174 having a downwardly projecting portion 176 in which is formed a rectangular open-ended groove 178 (Fig. 13), the top of the groove being closed by a block 180 secured at 182 to the projection 176. Lying in the groove and projecting therefrom at its ends is a pin 184 on which are loosely mounted two substantially cubical blocks 190, 192 (Fig. 14) that fit the groove sidewise but have vertical movement therein. Between the blocks 190, 192 is a third block 194 splined to the pin 184 and having its corners chamfered off at 196 (Fig. 13). The distance from each chamfered surface to the pin 184 is greater than the distance from each of its sides to the pin, the difference between these distances being about the same as the vertical movement provided for the blocks 190, 192 in the groove 178, that is, the thickness of canvas. The pin 184 loose in the blocks 190, 192 passes at one end (Fig. 14) loosely through a lever 198, 200 and at the other end through a link 202 beyond which it projects far enough to have an eight-toothed ratchet wheel 204 (Fig. 11) secured thereto. The blocks 190, 192 guide the pin 184 and leave the block 194 free to turn when the pin is turned. The ratchet wheel has a gravity-operated retaining pawl 206 pivoted to the collar 174 and has an operating pawl 208 pivoted to the link 202 and held against the ratchet wheel by a spring 210. A pin 212 (Fig. 14) passes through a spacing collar 214, through the lower end of the link 202 and through a sleeve 216 formed on the lever arm 198. The ends of the pin project beyond the mentioned parts and each end is fixed to one of two link members 216, 218 formed integral with a web 220 connecting them. The upper ends of the link members are pivoted by a pin 222 to the sleeve 164. The end portions 224, 226 of the pin 222 which engage the link members have the same eccentricity to the part of the pin in the bearing in the sleeve 164, the end 226 in the link 218 being smaller than the pin 222, and the end 224 in the link 216 being larger than the part of the pin in the bearing to permit assembling of the parts. On the end portion 224 of the pin 222 is secured by a tapered pin 228 a segment 230 (Fig. 11) having therein a circular slot 232 through which extends a threaded stud 234 which is anchored in the sleeve 164. A wing nut 236 on the stud 234 secures the segment in adjusted position. By turning the segment the links 216, 218 are raised and lowered by the eccentric portions 224, 226 of the pin 222 and hence the operating position of the table 160 is varied as may be desired to accommodate variations in the thickness of matrices, which variations may be due for example to atmospheric conditions.

The lower arm 198 (Fig. 14) of the lever which fulcrums on the pin 184 forms with the link 202 the short links of a double inverted toggle of which 216, 218 are the long links. The lever 198, 200 has its arm 200 pivoted to a treadle rod 238, 239 which is made adjustable for length by a block 240 (Fig. 6) in the same manner as the treadle rod 122, 123. The lower end (Fig. 5) of the rod 239 is pivoted to a lateral projection 242 on a treadle lever 244 pivoted at 246 to the wing 128. Depression of a treadle 248 on the lever 244 turns the lever 198, 200 (Fig. 11) clockwise, swinging the long links 216, 218 to the left, thus lowering the table 160 to permit insertion of the work. Upon release of the treadle 248 a spring 250 (Fig. 6) connected at its lower end to the block 240 on the treadle rod 238 and at the other end to the bracket 56 reacts to straighten the toggle and raise the work support to its operative position, the straight position of the toggle being determined by contact of a surface 252 (Fig. 11) on the web 220 with the left-hand face of the extension 176 of the collar 174 secured to the stem 162 of the work-supporting table 160.

The clockwise swinging movement of the link 202 (Fig. 11) is sufficient to cause the pawl 208 carried thereby to engage the next tooth of the ratchet wheel 204, and when the link is restored to its vertical position the pawl 208 turns the ratchet wheel 204, the pin 184 and the block 194 splined thereon one-eighth of a turn, causing the block 194 to sustain the work support either on the chamfered corner 196 or on one of its sides.

To enable the operator to tell whether the table 160 is in its high or low position, a finger 254 (Fig. 11) secured to the fixed sleeve 164 extends up to a point flush with the top of the table 160 when in its lower position, that is, when one of the sides of the block 194 supports the table. If one of the chamfered corners 196 is supporting the table, the end of the finger 254 will be noticeably below the top of the table, and the operator, if he is operating on the first side of the matrix, will know that the table is at the proper height. If the finger is flush with the top of the table he will operate the treadle again. Of course, since the operator will normally operate first on one side of the matrix and then on the other, the table will be automatically presented at the proper height with no attention on his part.

As best shown in Figs. 15 and 24, there is mounted on a block 256 secured to the table 160 a series of rolls 260 (for example, three). The axes 262 of the rolls are parallel but are so inclined to the direction of feed that they tend to crowd the matrix in toward an edge guide 264 (Fig. 16) which runs in the edge groove E of the matrix M. The inner portions of the rolls 260 (Fig. 15) are tapered to different extents lengthwise, the line between the cylindrical and tapered portions being in the direction of feed. On the table 160 (Fig. 24) is an upright 266 to which is secured by screws 267 a horizontal member 268 which carries the edge guide 264. The edge guide (Fig. 16) is set into the under side of the member 268 and has in its upper face a countersunk slot 270 to receive the head of a screw 272 which is threaded into the guide so that the guide can be adjusted in and out. On top of the member 268 is a cover plate 274 having downturned edge portions 276 secured by screws 278 to the member 268. The plate 274 projects beyond the outer end of the member 268 and supports the marginal portion of the canvas C which is being tucked into the groove of the matrix. The plate can move heightwise to some extent about the screws 278 which serve as a hinge and has a hole 280 therein which affords access to the screw 272 for adjusting the guide 264.

The matrix M (Fig. 25) has a tang T near its rear end upon which a piece of canvas C larger than the matrix is impaled. The operator draws the canvas straight and holds it in proper position to cover the matrix while he depresses the treadle 248 to lower the table 160. He then places the matrix on the rolls 260 with the bottom of the edge groove E against the guide 264, he moves the matrix toeward until the end A of the groove E at the breast line engages the guide 264 and releases the treadle. As the spring 250 acts to return the links 216, 218 to their vertical position to raise the support, the spring-pressed pawl 208 on the link 202 engages the eight-toothed ratchet wheel 204 and turns the block 194 so that one of its chamfered corners 196 engages the lower face of the block 180. He then depresses the treadle 136 to start the machine and performs the operation of tucking the canvas into the groove on one side of the matrix. After the operation of tucking the canvas C into the groove V on one side is completed, the treadle 248 is depressed to release the matrix which is then turned the other side up and is again presented to the machine with another piece of canvas, as above described. When the treadle is released, the block 194 will be turned so that one of its flat sides engages the under side of the block 180, and the table 160 will be again supported when the treadle is released but in a lower position to compensate for the thickness of the canvas already applied to the first side of the matrix.

*Canvas tucking mechanism*

The means for tucking the canvas into the groove V of the matrix M is shown in detail in Figs. 18, 19 and 20. A bracket 300 (Fig. 18) is secured by screws 302 to the head casing 58. To this bracket is secured by screws 303 a block 304 in which is formed a rectilinear slideway 306 (Fig. 20) for a tucking slide 308. As seen from the front (Fig. 18) the slide is inclined at about 45° from the vertical and, as seen in Fig. 19 which is taken in the direction of the arrow F in Fig. 18, the slide is inclined at 25° toward the machine head from a vertical plane parallel to the front of the machine. Thus the slide moves in a rectilinear path and in a plane parallel to the inclined walls of the groove V of the matrix at the operating point. The slide 308 carries a tucking tool 310 secured thereto by a screw 311. Reciprocation of the slide 308 moves the tool 310 from a point slightly above the upper face of the matrix to a point substantially at the bottom of the groove, thus acting to progressively tuck the canvas into the groove. The slide 308 is pivoted by a headless stud 312 to a head 314 secured to a stem 316. On the stem is a loose flanged collar 318 and a sliding block 320. Between the head 314 and the flange of the collar 318 is a compression spring 322 so that movement of the block 320 will be transmitted yieldingly to the tucking tool 310 as it is moved to tuck the canvas into the groove. To reciprocate the block 320 (Fig. 19), it is embraced by bifurcations of an arm 324 of an angle lever fulcrumed by a bolt 326 on the bracket 300. A pin 328 passes through the bifurcations and the block 320 and is large enough to be bored transversely freely to receive the stem 316 upon which set nuts 323 are adjustable to vary the initial compression of the spring 322. The angle lever fulcrumed at 326 has another arm 330 connected by a link 332 to a plunger 336 which extends (Fig. 10) through the wall of the head casing 58 and is supported in bearings 338 extending inwardly from the walls of the casing. To operate the plunger a U-shaped lever is provided comprising a sleeve 340 (Fig. 21) which is mounted on a shaft 341, the sleeve having two upwardly extending arms 342, 344, the arm 342 carrying a roll 346 (Fig. 10) which engages a notch in the plunger 336 between the bearings 338, and the arm 344 carrying a roll 348 engaging a tortuous cam track 350 in a barrel cam 352 secured to the main shaft 100, the track being shaped to move the plunger to and fro four times for each rotation of the shaft 100.

The tucker bar 308 is held in its guideway by a plate 353 (Fig. 20) held to the block 304 by two screws 354, 356, the screw 354 engaging an open slot 358 in the plate, and the screw 356 engaging a buttonhole slot 360 in the plate. By loosening the screws the plate 353 may be moved to the right and taken off, thus exposing the tucker bar 308 which may be lifted off the headless stud 312 and taken out for repair or replacement of the tucker finger 310.

The core piece P (Fig. 25ª) consists of a thick portion R to be inserted in the fold of the canvas and a thin portion N which serves as a reinforcement of the insole at the base of the inner side of the rib. The core piece may consist of a wider strip of canvas or other suitable material to which is cemented a narrower piece of canvas with one of its edges flush with the wider strip. The narrow strip is preferably prepared as disclosed in an application for Letters Patent of the United States Serial No. 81,938, filed March 17, 1949, in the name of Stanley M. Griswold. The composite core piece is coated upon one side at least with pressure-responsive cement. The core piece P is wound in a flat condition on a reel 362 (Fig. 8) which is supported by dropping its axis 363 into upwardly open slots in arms 364 of a reel support 365 secured by screws 366 to the top of the casing 58.

*Core-piece feeding mechanism*

Means is provided for feeding the core piece independently of the matrix comprising (Fig. 19) a pawl 368 having teeth 369 on the edge thereof which engages the thick portion R of the core piece P. The pawl 368 is pivoted at 370 to an arm 371 of an angle lever fulcrumed at 372 on the block 304. The pawl is moved toward the core piece by a torsion spring 374 and can be moved away from the core piece to release it by a handle 378. Another arm 380 of the angle lever fulcrumed at 372 is bifurcated to embrace a block 382 to which it is pivoted by a pin 383. The block slides on a stem 384 pivoted at 386 to a plunger 388 which extends through the casing 58. The stem 384 passes through a transverse hole in the pin 383. Between the block 382 and the plunger 388 is a spring 390 so that the movement of the plunger will actuate the pawl 368 yieldingly in the direction of feed. The stem 384 has set nuts 392 threaded thereon by adjustment of which the initial stress of the spring 390 may be varied. The plunger 388 is actuated by means inside the casing comprising (Fig. 21) a sleeve 394 on a shaft 396, the sleeve having an arm 398 which between its ends has a branch arm 399 carrying a roll 400 which engages a notch in the plunger 388. The upper end of the arm 398 (Fig. 10) carries a roll 402 engaging a path 404 in the barrel car 352, the cam path being formed to give the plunger one complete reciprocation, that is, a to-and-fro movement, for each rotation of the shaft 100.

The toothed portion of the pawl 368 extends through a slot 406 (Fig. 18) in a plate 408 secured by screws 410 to the block 304. The inner face of the plate is shaped, as shown in Fig. 24, so as to form with the block 304 a slot to receive the core piece, the slot having two portions 412, 414 at right angles to each other, the portion 414 receiving the thick part of the core piece and the portion 412 the thin portion or flange N of the core piece. As the flat core piece leaves the reel 362 it engages a straight bar 416 (Fig. 8) secured to the reel bracket 365 and then passes through a straight slot 417 (Fig. 24) in a guide 418 secured at 419 to the block 304. The core piece then enters the right-angular slot 412, 414 and is fed along by the pawl 368 which acts on the thick part of the core piece through the slot 406 in the plate 408.

*Work-feeding mechanism*

To advance the work for the progressive action of the tucking tool 310, a four-motion feed foot 420 (Fig. 23) is provided which engages the canvas on the matrix on both sides of the groove as well as the core piece and its flange N, the foot moving leftwise (Fig. 6) to feed the work. The foot 420 (Fig. 28) has a horizontal groove 421 at its upper end which engages a rib 422 on a member 423 (Fig. 23) and is held by a screw 424 which passes through a horizontal slot 425 in the foot and is threaded into the member 423. This member has a long thin stem 426 (Fig. 6) of two diameters with a shoulder at 427, the stem extending up through two arms 428, 430 of a yoke 432 which is moved to and fro by an eccentric stud 434 on the main shaft 100. A compression spring 436 on the stem 426 rests on a washer 438 which engages the shoulder 427 of the stem 426. Above the spring 436 is a washer 440 on the stem and beneath a sleeve 442 which extends up through the arm 430 and has set nuts 444 threaded thereon. The stem 426 extends up through the sleeve 442 and through a block 446 and has set nuts 448 threaded thereon. The block 446 is pivoted by a pin 450 to an arm 452 splined on a shaft 454 which extends through the casing and is journaled in the front and rear walls thereof. The shaft 454 (Fig. 9) has a sleeve 456 pinned and splined thereon, the sleeve having an arm 458 pivoted at 460 to an eccentric strap 462 on a counterbalanced eccentric 464 fixed on the main shaft 100.

When the arm 452 (Fig. 6) moves up, the block 446 engages the nuts 448 and positively lifts the stem 426 and the feed foot 420. When the arm 452 moves down, the block 446 presses on the nuts 444 on the sleeve 442 which, through the spring 436, imparts downward pressure yieldingly to the stem 426 and the feed foot 420. The stud 434 on the shaft 100 and the eccentric 464 are so rotationally related that the feed foot 420 has an orbital path which, if the spring 436 does not yield, is substantially an ellipse with its major axis inclined to the vertical, as indicated in Fig. 23ª. If the feed foot engages the work and the spring 436 is compressed, the lower portion of the ellipse is flattened, as indicated by the dotted portion of the line A—B. Under these conditions, however, it will be apparent that the feed foot has a component of movement in the direction B—A at the time it engages the work. This is taken advantage of by providing on the feed foot 420 (Fig. 29) a portion 470 having inclined ribs 472 which engage the thin portion N of the core piece and act to smooth inwardly that portion due to the horizontal component of the movement of the foot as it engages the work.

*Wiper mechanism*

It is important that in the completed insole there be no looseness of the rib materials at the base of the rib and on its inner side and that these materials be closely drawn against the inner wall of the groove V, especially against the angle between the flat face of the matrix and the inner wall of the groove. For this purpose, in place of the part 470 a wiper mechanism for smoothing inwardly of the matrix the portion N of the core piece may be provided, as shown in Fig. 23. A lever 474 is pivoted at 476 to the feed foot 420, and to the lever between its ends is pivoted at 478 a wiper 480. In a bore in the lever 474 is a compression spring 482 which bears on the free end portion of the wiper 480 so that when the lever 474 is moved counterclockwise the wiper 480 moves in the direction of the arrow and wipes inwardly of the matrix the inner portion N of the core piece.

To so move the lever 474 it is connected by a ball joint 484 to a rod 486 which is threaded into a sleeve 488 having a ball-joint connection 490 to an arm 492 of an angle lever fulcrumed at 494 to a bracket 496 secured to the casing 58. A vertical arm 498 of the angle lever is connected by a link 500 to a plunger 502.

As shown in Fig. 10, the plunger 502 is mounted in bearings 504, 506 inside the casing 58 and has a notch which is engaged by a roll 508 on a vertical arm 510 integral with a sleeve 512 (Fig. 21) mounted to rock on a shaft 514. Another arm 516 integral with the sleeve 512 has a roll 518 which engages a path cam 520 in the barrel cam 350 on the main shaft 100, the sleeve 512 and the arms 510, 516 constituting a U-shaped lever fulcrumed at its lower end. The cam path 520 is so shaped as to withdraw the plunger 502 to lift the lever arm 492 and operate the wiper 480 after the feed foot 420 has engaged and is feeding the work. The length of the ball-ended link 486, 488 may be adjusted by turning the rod 486 by a wrench applied to an octagonal portion 522 (Fig. 23) thereon.

In order that the fold of canvas tucked into the groove may form a firm and suitable sewing rib as well as provide greater body and strength in the completed insole, the canvas C when applied to the matrix has been treated with a stiffening material, such as a natural or synthetic resin, on the exposed side and is also coated on that side with pressure-responsive cement. Since it is difficult to tuck the thus-stiffened canvas into the groove, it is desired to render the canvas temporarily limp in the region where the tucking operation is occurring. When the stiffening material is resin or other thermoplastic material, heat for rendering the canvas limp is provided by a hot-air blast apparatus such as that shown in Figs. 4 and 4a.

*Hot-air blast apparatus*

A heating element 524 (Fig. 4a) is electrically connected at its two ends 525, 526 to a source of current, the element being located in the center of a tube 528 with insulation 529 packed between it and the tube. Surrounding the tube 528 is a tube 530 between which and the tube 528 is a heat-transfer element 532 consisting of a sheet of metal, for example aluminum, which is bent back and forth into a series of folds and wrapped around the tube 528, the inner portions of the folds contacting the tube 528 and the outer portions of the folds contacting the tube 530. A blower 536 driven by an electric motor 537 (Fig. 1) forces air through the tube 530 between the folds of the transfer element 532, the air being thus heated. The hot air is discharged through an insulated tube 538 directed toward the region where the tucking operation is progressing. The heating apparatus is surrounded by a perforated guard 540. The tube 530 has a flange 542 secured by screws 544 to a support 546 having slots 548 through which pass screws 550 by which it is secured to the head 58 (Fig. 8), the whole heating apparatus being adjustable longitudinally by reason of the slots 548 (Fig. 6).

In tucking the canvas into sharply curved portions of the groove V, as in rounding the toe, it is desirable to provide auxiliary feeding means for the canvas to avoid wrinkles therein. The canvas C (Fig. 23) extends more or less beyond the periphery of the matrix M where it rests on the plate 274 carried by the work-supporting table 160.

*Auxiliary feed mechanism*

A shaft 552 (Fig. 11) projecting through the casing 58 carries a sprocket wheel 554 connected by a chain 556 to a similar sprocket wheel 558 on a shaft 560 carried by a lever 564 fulcrumed on the shaft 552 and connected at 568 to a vertical rod 570. An adjustable stop 572 has a screw-and-slot connection 574 with the lever 564 and limits downward movement of the rod 570 by engaging the top of the member 268 carried by the work support 160. On the shaft 560 is a ten-toothed auxiliary feed wheel 576 (Figs. 12 and 23) rotated to engage the marginal portion of the canvas C which projects beyond the matrix M and lies on the plate 274. The stop 572 is set to limit downward movement of the feed wheel 576 to prevent actual contact of the teeth of the feed wheel with the plate 274, thus preventing wear of the teeth when no canvas is between the feed wheel and the plate. The outer edge of the plate 274 lies close to the matrix and supports the margin of the canvas so that the feed wheel may be located close to the operating point. Rotation of the feed wheel is so timed relatively to the movement of the tucking tool 310 that one of its teeth (Fig. 12) is over the canvas when the tool 310 is withdrawn and a space between the teeth will be over the canvas during the action of the tucking tool 310 in tucking a fold of canvas into the groove V of the matrix. The feed wheel 576 is arranged to be depressed yieldingly to engage the canvas at the will of the operator.

For this purpose the rod 570 is yieldingly connected to another rod 578, as shown in Fig. 7. The rod 570 has secured to it a piece 580 having a hole through which the rod 578 freely passes. Secured to the rod 578 is a piece 582 having a hole through which the rod 570 freely passes. A compression spring 584 is located on the rod 578 between the pieces 580, 582, thus providing a yielding connection between the rods. The rod 578 (Fig. 6) passes through two ears 586 on a member 588, a thumb nut 590 being threaded on the rod 578 between the ears. The member 588 is bored to receive a rod 592 which is held therein by a set-screw 594. The nut 590 provides a fine adjustment and the set-screw 594 affords a coarse adjustment for the combined length of the rods 578, 592. The rod 592 is pivoted at 596 (Fig. 3) to a treadle lever 598 fulcrumed at 246 on the same shaft as the treadle lever 244 and having a treadle 600 sustained by a spring 601.

To drive the auxiliary feed wheel 576 the shaft 552 inside the casing 58 (Figs. 10 and 21) carries a gear 604 which meshes with a gear 606 mounted on the stub shaft 608 (Fig. 10) mounted on a bracket 610 in the casing 58. The gear 606 (Fig. 21) meshes with a gear 612 fixed to the main shaft 100. The gear ratio between the shaft 100 and the shaft 552 is 2.5:1 or 10:4, ten revolutions of the shaft 100 thus producing forty reciprocations of the tool 310, and four rotations of the shaft 552 presenting a space between the teeth of the ten-toothed wheel 576 to the work forty times, the parts being so timed that a tooth of the wheel 576 will be operative to feed the canvas during the interval when the tucking tool 310 is withdrawn from the groove V.

On the rod 570 (Fig. 23) are set-nuts 614 below which on the rod is a sleeve 616 loose on the rod and resting on the bracket 56. The nuts 614 are adjusted to engage the sleeve 616 and prevent excessive downward movement of the auxiliary feed wheel 576 when the table 160 and the member 268 on which the stop 572 normally rests are lowered.

When the operator desires the assistance of the auxiliary feed wheel, for example when rounding the toe, he depresses the treadle 600 as far as permitted by a stop screw 618, thus causing the rod 570 to be drawn down by a force determined by compression of the spring 584 (Fig. 7). The thumb nut 590 (Fig. 6) provides a fine adjustment for the amount of compression of the spring 584 and hence for the pressure with which the auxiliary feed wheel is held against the work, which pressure is rather critical.

When the canvas has been tucked into the groove V of the matrix and the core piece inserted in the fold of canvas, the abutment A at the opposite end of the groove E will arrive adjacent to the guide 264 and the core piece should be severed.

Core-piece-severing mechanism

Severing of the core piece is done automatically by engagement of the abutment A with a trigger 620 (Fig. 11) located adjacent to the guide 264. The trigger has a sleeve portion 622 pinned to a vertical pin 624 (Fig. 24) on which is a sleeve portion 626 of a lever 628, the sleeves 622 and 626 being interengaged at 630 (Fig. 11) so that leftwise pressure on the trigger 620 (Fig. 16) will move the lever 628 clockwise, compressing a spring 632 and causing a screw 634 on the lever to engage a button 636 on a microswitch 638 secured to the table 160 by screws 640. The microswitch 638 is connected by flexible leads 642 to the switch box 80 (Fig. 1) from which leads are carried to a solenoid 646 (Fig. 6). The armature 648 of the solenoid is pivoted at 650 to an arm 652 (Fig. 9) on a rockshaft 654 journaled in a bracket 656 secured to the head 58. Another arm 658 on the rockshaft is pivoted at 660 (Fig. 23) to a link 662 the lower end of which is pivoted at 664 to a knife carrier 666 to which a knife 670 is secured by screws 671 (Fig. 22). The knife carrier has bifurcations 672 which are pivoted at 674 to an extension 676 of the block 304. The block extension has a surface 678 curved from 674 as a center with which the knife 670, curved from the same center, cooperates to sever the core piece, the path of which as it is fed toward the groove V of the matrix is intersected by the knife when it is moved about the pivot 674 by a downward movement of the link 662 due to upward movement of the armature 648 when the solenoid is energized by a movement of the trigger 620. The lever 628 is extended to form a handle by which the microswitch 638 may be operated at any time to sever the core piece.

The casing 58 is oil tight, the opening at the top shown in Fig. 9 being closed by a plate 680 as shown in Fig. 6. The plungers 336, 388 and 502 are provided with packing rings 682 (Fig. 23) to prevent leakage of oil by them, and the casing is filled with oil up to a point visible through a window 684 (Fig. 8). Agitation of the oil by the mechanism enclosed in the casing serves to keep all the mechanism therein well oiled.

The motor 88 is started by pressing a button 686 (Fig. 8) to close a normally open switch and is stopped by pressing a button 688 to open a normally closed switch. A pilot light 690 indicates that the motor 88 is being supplied with current, the wiring being as indicated in the diagram of Fig. 26. Three leads 692 supply current at 220 volts to the motor 88 which is three phase. Current is supplied at 110 volts to mains 694, 696 by a transformer 696 connected to adjacent leads 692. Momentary pressure on the button 686 supplies current to a solenoid 700 which closes a quadruple switch comprising four switches operating together, the three lower switches supplying current to the three-phase motor 88 and the upper switch bridging the switch 686 to continue the supply of current to the solenoid 700 after the button 686 is released as well as to the pilot light 690. When the motor is running, closing of the microswitch 638 supplies current to a relay 702 operation of which supplies current to the solenoid 646 which operates the cut-off knife through the lever 652, 658 and the link 662. Momentary pressure on the button 688 breaks the current to the solenoid 700, allowing the quadruple switch to open and stop the motor 88.

Electrical connections for the blower motor 537 and the heating element 524 are shown in Fig. 27. Two double pole switches 704, 706 located on the switch box 644, as shown in Fig. 8, are provided and both have to be closed to operate the blower and the heater; that is, the heater cannot be turned on without turning on the blower. Closing of the switch 704 turns on a pilot light 708 and closing of the switch 706 supplies current to the heating element 524 and to the motor 537 of the blower.

Having thus described our invention, what we claim as new and desire to secure by Letters Patent of the United States is:

1. In a machine for working sheet material into the groove of an insole-shaped matrix having a groove therein, the combination of a support for the matrix, a head casing, a shaft extending through two walls of the casing, a cam on the shaft within the casing, said cam having a plurality of cam paths, a rockshaft, two arms on the rockshaft, a reciprocating tool for tucking the sheet material into the groove, a plunger extending through the casing, one arm of the rockshaft engaging one path in the cam, the other arm on the rockshaft engaging the plunger, connections from the plunger to reciprocate the tool, a four-motion feed foot operated from said shaft to feed the matrix, a core-piece-feeding pawl, a second plunger extending through the casing operatively connected to said pawl, and means for operating the second plunger from another path of said cam.

2. In a machine for working sheet material into the groove of an insole-shaped matrix having a rib groove therein and inserting a core piece in the groove, the combination of a support for the matrix, a head casing, a shaft extending through two walls of the casing, a cam on the shaft within the casing, a reciprocating tool for tucking the sheet material into the groove of the matrix, said tool being operated from said shaft by means extending through a wall of the casing, a four-motion feed foot operated by eccentrics on said shaft to feed the matrix, one eccentric being within the casing and the other outside the casing, core-piece-feeding means, a plunger extending through a wall of the casing for operating the core-piece-feeding means, and connections between the plunger and the cam in the casing to cause reciprocation of the plunger.

3. In a machine of the class described, the combination of a head casing, a shaft extending through two walls of the casing, a barrel cam on said shaft having a plurality of cam tracks, a plurality of plungers extending through a wall of the casing, means connecting each plunger to one of the cam tracks in the cam, and operating instrumentalities outside of the casing each operatively connected to one of the plungers.

4. A machine for forming ribs in sheet material having, in combination, a frame, a support on the frame for a grooved matrix, a reciprocating tool mounted on the frame for forcing a fold of the sheet material into the groove in the matrix, a stationary guide having a slot portions of which are at right angles to each other, through which slot a flat core piece is drawn, a reciprocating pawl for intermittently drawing the core piece through the slot to form portions thereof at right angles to each other, and a four-motion feed foot mounted on the frame for forcing one portion of the core piece into the fold of the sheet material and pressing the other portion against the sheet material adjacent to the fold.

5. A machine for forming an article from sheet material having, in combination, means for forcing a fold of sheet material into the groove in a matrix, a guide having a slot portions of which are at right angles to each other through which a flat core piece is drawn, means for drawing the core piece through said slot to present a portion thereof over the fold formed in the sheet material, and a feed foot for inserting one portion of the core piece into the fold and pressing another portion thereof down upon the sheet material outside the fold, said feed foot operating in an elliptical path in a vertical plane, the major axis of the ellipse being inclined to the vertical.

6. A machine for tucking sheet material into the groove of a matrix having, in combination, a tucking tool for forming in the groove a fold of material, means for supplying a flat core piece, a guide having a slot portions of which are at right angles to each other through which the core piece is led, a reciprocating toothed pawl for advancing the core piece through the slot and presenting it over the fold, and a four-motion feed foot acting to insert the core piece into the fold and to feed the matrix to cause progressive formation of the fold and insertion of the core piece.

7. In a machine for working sheet material into a groove of a matrix, the combination of a head casing, a shaft extending through opposite walls of the casing, a barrel cam on the shaft having a plurality of cam tracks, a plurality of plungers extending through a wall of the casing, a reciprocating tool for tucking the sheet material into the groove to form a fold therein, a four-motion feed foot operated by eccentrics on said shaft, means for presenting a flanged core piece adjacent to the fold of canvas in the groove, said feed foot acting to insert a portion of the core piece into the fold and feed the matrix, operative connections between the core-piece-presenting means and one of the plungers, and operative connections from the tucking tool to another of said plungers.

8. A machine for forming ribs in sheet material having, in combination, a frame, a support on the frame for a grooved matrix, a reciprocating tool mounted on the frame for forcing a fold of the sheet material into the groove in the matrix, an angular guide having a slot portions of which are at right angles to each other, a reciprocating pawl for intermittently feeding the core piece and presenting a portion of the core piece vertically over the groove of the matrix, a four-motion feed foot having vertical and horizontal components of movement mounted on the frame for engaging the horizontal portion of the core piece and forcing, by its vertical component, the vertical portion of the core piece into the groove, and inclined ribs of the feed foot engaging the horizontal portion of the core piece, a horizontal component of the feed-foot motion causing the ribs thereon to smooth out the horizontal portion of the core piece in a direction away from the fold in the sheet material as the vertical portion of the core piece is forced into the fold.

9. In a machine for working canvas and a core piece into a groove in a matrix, the combination of a head casing, a shaft extending through two walls of the casing, a barrel cam on said shaft having a plurality of cam tracks, a plurality of plungers extending through a wall of the casing, means connecting each plunger operatively to one of the tracks in the cam, a tucking tool operated by one of the plungers, core-piece-feeding means operated by another of the plungers, and means for feeding the matrix.

10. In a machine for working sheet material into the groove of a matrix, the combination of a head casing, a shaft extending through opposite walls of the casing, a barrel cam on the shaft having a plurality of cam tracks, a plurality of plungers extending through a wall of the casing, U-shaped levers in the casing fulcrumed at the closed end, one arm of each lever engaging a plunger and the other arm a track in the cam, a reciprocating tool for tucking the sheet material into the groove to form a fold therein operatively connected to one of the plungers, means for presenting a flanged core piece adjacent to the fold in the groove, means for wiping the flange of the core piece operatively connected to another plunger, and a feed foot operated by eccentrics, said foot acting to insert a portion of the core piece into the fold and to feed the matrix.

11. In a machine of the class described, the combination of a head casing, a shaft extending through two walls of the casing, a barrel cam on said shaft having a plurality of cam tracks, one of said cam tracks being tortuous, a plurality of plungers extending through a wall of the casing, means connecting each plunger to one of the tracks in the cam, a reciprocating tucking tool operatively connected to the plunger operated by the tortuous track, and core feeding means operatively connected to another plunger.

12. In a machine for working sheet material into the groove of an insole-shaped matrix having a rib groove therein and inserting a core piece into the groove, the combination of a support for the matrix, a head casing, a shaft extending through two walls of the casing, a barrel cam having three cam tracks on the shaft within the casing, three plungers extending through a wall of the casing, lever means operatively connecting each plunger to one of the cam tracks, a reciprocating tool for tucking the sheet material into the groove of the matrix, said tool being operatively connected to one of said plungers, means for feeding a flanged core piece operatively connected to another plunger, means for wiping the flange of the core piece inwardly of the matrix operatively connected to the third plunger, and a four-motion feed foot for feeding the matrix.

13. In a machine for working sheet material into a groove in a matrix and inserting a flanged core piece in the groove, the combination of a head casing, a shaft extending through opposite walls of the casing, a barrel cam on the shaft having a plurality of cam tracks, a plurality of plungers extending through a wall of the casing, each plunger being operated by one of the cam tracks, a reciprocating tool for tucking sheet material into the groove to form a fold therein, said tool being operatively connected to one of said plungers, means for presenting a flanged core piece adjacent to the fold in the canvas, said means being operatively connected to another of said plungers, a feed foot acting to insert a portion of the core piece into the fold and to feed the matrix, and means for wiping the flange of the core piece, said means being operatively connected to a third plunger.

14. A machine for operating on canvas placed over a grooved insole-shaped matrix and extending beyond the matrix having, in combination, a vertically movable support for the matrix, a plate carried by the matrix support for supporting the margin of the canvas, a feed foot for feeding the matrix and canvas, a reciprocating tucking tool for working the canvas into the groove of the matrix as it is fed, a vertically movable bearing, a toothed auxiliary feed wheel mounted therein and movable vertically to engage the canvas on said plate, gearing for operating the toothed wheel in timed relation to the reciprocating tool, and a stop on the bearing for engaging said plate to limit movement of the toothed wheel toward the canvas support when the matrix support is raised.

15. A machine for operating on canvas placed over a grooved insole-shaped matrix and extending beyond the matrix having, in combination, a frame, a vertically movable support for the matrix mounted on the frame, a plate carried by the matrix support for supporting the margin of the canvas, a four-motion feed foot for feeding the matrix and canvas, a reciprocating tucking tool for working the canvas into the groove of the matrix as it is fed, a movable bearing, a toothed auxiliary feed wheel mounted on the bearing and movable vertically to cause the toothed wheel to engage the canvas on said plate, gearing for rotating the toothed wheel in timed relation to the reciprocating tool, a stop on the bearing of the toothed wheel for limiting movement of the toothed wheel toward the plate by engagement therewith when the matrix support is raised, and a stop carried by the bearing and engaging the frame for limiting downward movement of the toothed wheel when the matrix support is lowered.

16. In a machine for tucking sheet material into grooves on opposite faces of an insole-shaped matrix, the combination of a reciprocating tool for progressively tucking the material into the groove first on one side of the matrix and then on the other, a depressible matrix support, means for positively sustaining the support at the proper height for the first operation comprising a block having four sides and chamfered corners, the support being first sustained by one of the corners, a pin passing centrally through the other two sides of the chamfered block and secured thereto, a member on the matrix support having a slot in which the chamfered block can turn, guide blocks loose on the pin one at each end of the chamfered block, said guide blocks fitting the groove sidewise and arranged for slight vertical movement therein, an eight-toothed ratchet wheel fixed to the pin, a pawl on the member for retaining the ratchet wheel, and a pawl operable by depression and elevation of the support for turning the ratchet wheel one-eighth of a turn whereby, when the matrix is released by depression of the support, the matrix turned over, placed on the support and the support raised, the support will be sustained by a side of the chamfered block and at a height lower than its first position to compensate for the thickness of sheet material already applied to the matrix.

17. In a machine for working sheet material and a core piece into a rib groove in an insole-shaped matrix, said matrix having an abutment in its edge face at the breast line, a frame, a depressible support for the matrix mounted on the frame, a reciprocating tool mounted on the frame for tucking sheet material into the groove of the matrix to form a fold therein, a reciprocating pawl for presenting a core piece into position to be inserted into the fold, a four-motion feed foot for forcing the core piece into the fold and feeding the matrix, a knife for cutting off the core piece, a solenoid on the frame for operating the knife, a microswitch carried by the matrix support, a flexible conductor from the solenoid to the microswitch for supplying current thereto, a lever pivoted on the support and movable to close the microswitch, and a trigger on the lever engageable with the abutment for closing the switch to cause operation of the solenoid and knife to sever the core piece.

JOHN J. MACIEJOWSKI.
FRED T. MacKENZIE.

REFERENCES CITED

The following references are of record in the file of this patent:

UNITED STATES PATENTS

| Number | Name | Date |
|---|---|---|
| 215,547 | Turner | May 20, 1879 |
| 1,144,797 | Seymour | June 29, 1915 |
| 1,397,071 | Becker | Nov. 15, 1921 |
| 2,043,094 | Cundall et al. | June 2, 1936 |
| 2,493,207 | Paulsen | Jan. 3, 1950 |
| 2,494,578 | Paulsen | Jan. 17, 1950 |

FOREIGN PATENTS

| Number | Country | Date |
|---|---|---|
| 20,508 | Great Britain | Nov. 3, 1910 |